United States Patent
Koo et al.

(10) Patent No.: US 8,325,814 B2
(45) Date of Patent: Dec. 4, 2012

(54) METHOD AND APPARATUS FOR PROCESSING A VIDEO SIGNAL

(75) Inventors: Han Suh Koo, Seoul (KR); Yeon Kwan Koo, legal representative, Seoul (KR); Byeong Moon Jeon, Seoul (KR); Seung Wook Park, Seoul (KR); Yong Joon Jeon, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 627 days.

(21) Appl. No.: 12/308,369

(22) PCT Filed: Jun. 19, 2007

(86) PCT No.: PCT/KR2007/002964
§ 371 (c)(1),
(2), (4) Date: Dec. 23, 2009

(87) PCT Pub. No.: WO2007/148906
PCT Pub. Date: Dec. 27, 2007

(65) Prior Publication Data
US 2010/0177824 A1 Jul. 15, 2010

Related U.S. Application Data

(60) Provisional application No. 60/814,561, filed on Jun. 19, 2006, provisional application No. 60/830,685, filed on Jul. 14, 2006, provisional application No. 60/830,599, filed on Jul. 14, 2006, provisional application No. 60/832,153, filed on Jul. 21, 2006, provisional application No. 60/842,151, filed on Sep. 5, 2006, provisional application No. 60/852,700, filed on Oct. 19, 2006, provisional application No. 60/853,775, filed on Oct. 24, 2006, provisional application No. 60/868,310, filed on Dec. 1, 2006, provisional application No. 60/907,807, filed on Apr. 18, 2007, provisional application No. 60/924,602, filed on May 22, 2007, provisional application No. 60/929,046, filed on Jun. 8, 2007.

(51) Int. Cl.
*H04N 7/12* (2006.01)
*H04N 11/02* (2006.01)
*H04N 11/04* (2006.01)

(52) U.S. Cl. .......... 375/240.16; 375/240.13; 375/240.25

(58) Field of Classification Search .................. None
See application file for complete search history.

(56) References Cited

U.S. PATENT DOCUMENTS
5,886,736 A 3/1999 Chen
(Continued)

FOREIGN PATENT DOCUMENTS
EP 0652678 A2 5/1995
(Continued)

OTHER PUBLICATIONS

"Multiview Video Coding Based on Global Motion Model" Guo and Huang, Department of Computer Science Technology, Harbin Institute of Technology, K. Aizawa, Y. Nakamura, and S. Satoh (Eds.): PCM 2004, LNCS 3333, pp. 665-672, 2004.*

(Continued)

*Primary Examiner* — Joseph Ustaris
*Assistant Examiner* — Kevin McInnish
(74) *Attorney, Agent, or Firm* — Harness, Dickey & Pierce, P.L.C.

(57) ABSTRACT

An apparatus for processing a video signal and method thereof are disclosed, by which duplication of inter-view pictures is eliminated to decode the video signal, by which a global motion vector of a current picture is generated based on relevance between inter-view pictures to decode the video signal, and by which motion information for a current picture is obtained based on relevance between inter-view pictures to perform motion compensation. The present invention includes extracting attribute information for a current block or attribute information for a current picture from the video signal, extracting motion skip information for the current block, and generating motion information for the current block using motion information for a reference block according to the attribute information and the motion skip information.

7 Claims, 18 Drawing Sheets

A : GDV

U.S. PATENT DOCUMENTS

| | | | |
|---|---|---|---|
| 6,055,012 A | 4/2000 | Haskell et al. | |
| 6,278,736 B1 | 8/2001 | De Haan et al. | |
| 6,441,844 B1 | 8/2002 | Tatsuzawa | |
| 6,804,301 B2 | 10/2004 | Wu et al. | |
| 7,489,342 B2 | 2/2009 | Xin et al. | |
| 7,671,894 B2 | 3/2010 | Yea et al. | |
| 7,710,462 B2 | 5/2010 | Xin et al. | |
| 7,728,877 B2 | 6/2010 | Xin et al. | |
| 7,817,865 B2 | 10/2010 | Yang | |
| 7,903,737 B2 | 3/2011 | Martinian et al. | |
| 2002/0014269 A1 | 2/2002 | Rossi et al. | |
| 2002/0106191 A1 | 8/2002 | Betz et al. | |
| 2002/0146239 A1 | 10/2002 | Hamasaka et al. | |
| 2003/0043909 A1 | 3/2003 | Akiyoshi et al. | |
| 2003/0138043 A1 | 7/2003 | Hannuksela | |
| 2003/0202592 A1 | 10/2003 | Sohn et al. | |
| 2003/0202594 A1* | 10/2003 | Lainema | 375/240.16 |
| 2004/0047415 A1 | 3/2004 | Robert et al. | |
| 2004/0120396 A1 | 6/2004 | Yun et al. | |
| 2006/0028489 A1 | 2/2006 | Uyttendaele et al. | |
| 2006/0146141 A1* | 7/2006 | Xin et al. | 348/211.7 |
| 2006/0146143 A1 | 7/2006 | Xin et al. | |
| 2006/0233247 A1 | 10/2006 | Visharam et al. | |
| 2006/0262856 A1* | 11/2006 | Wu et al. | 375/240.19 |
| 2007/0064799 A1 | 3/2007 | Ha | |
| 2007/0081814 A1 | 4/2007 | Ha et al. | |
| 2007/0121722 A1 | 5/2007 | Martinian et al. | |
| 2008/0089412 A1* | 4/2008 | Ugur et al. | 375/240.12 |
| 2008/0159638 A1* | 7/2008 | Song et al. | 382/233 |
| 2009/0010323 A1 | 1/2009 | Su et al. | |
| 2009/0116558 A1* | 5/2009 | Chen et al. | 375/240.16 |
| 2009/0147850 A1* | 6/2009 | Pandit | 375/240.15 |
| 2009/0168874 A1 | 7/2009 | Su et al. | |
| 2009/0185616 A1 | 7/2009 | Pandit et al. | |
| 2009/0225826 A1 | 9/2009 | Pandit et al. | |
| 2009/0304068 A1 | 12/2009 | Pandit et al. | |
| 2010/0322311 A1 | 12/2010 | Vetro et al. | |

FOREIGN PATENT DOCUMENTS

| | | |
|---|---|---|
| EP | 1784022 | 5/2007 |
| KR | 2002-0032954 | 2/2002 |
| KR | 10-2003-0063207 | 8/2003 |
| KR | 10-2004-0013540 | 2/2004 |
| KR | 10-2005-0122717 | 12/2005 |
| RU | 2005131939 A | 3/2006 |
| TW | 200536377 | 11/2005 |
| TW | 200620994 | 6/2006 |
| WO | WO 01/10132 | 2/2001 |
| WO | WO 01/10132 A2 | 2/2001 |
| WO | WO 03/053066 | 6/2003 |
| WO | WO 03/058978 | 7/2003 |
| WO | WO 03/093928 | 11/2003 |
| WO | WO 2004/014060 A2 | 2/2004 |
| WO | WO 2004/056125 | 7/2004 |
| WO | WO 2004/080078 | 9/2004 |
| WO | WO 2006/001653 | 1/2006 |
| WO | WO 2006/001653 A1 | 1/2006 |
| WO | WO 2006/062377 A1 | 6/2006 |

OTHER PUBLICATIONS

"Inter-View Direct Mode for Multiview Video Coding" Xun Guo Yan Lu Feng Wu IEEE Transactions on Circuits and Systems for Video Technology, Vol. 16, No. 12, Dec. 2006.*

Taiwan Office Action dated Dec. 27, 2010 issued in corresponding Taiwanese Application No. 096122165 and English translation thereof.

USPTO Office Action dated Jan. 5, 2010 for corresponding U.S. Appl. No. 12/604,718.

Korean Notice of Allowance dated Nov. 3, 2009 for corresponding Application No. 10-2008-7025375.

European Search Report dated Jan. 8, 2010 for corresponding Application No. 07745743.0.

Martinian, Emin et al.: "V-Picture Syntax for Random Access in Multi-view Video Compression" Joint Video Team (JVT) of ISO/IEC MPEG & ITU-T VCEG (ISO/IEC JTC1/SC29/WG11 and ITU-T SG16 Q6), No. M13121, Mar. 23, 2006, XP 030006640.

Vetro, Anthony et al.: "Joint Multiview Video Model (JFVM) 1.0" Joint Video Team (JVT) of ISO/IEC MPEG & ITU-T VCEG (ISO/IEC JTC1/SC29/WG11 and ITU-T SG16 Q.6), No. JVT-T208, Aug. 17, 2006, XP 030006640.

European Search Report dated Jan. 8, 2010 for corresponding Application No. 07745747.1.

Sohn, Kwangoon et al.: "H.264/AVC-compatible Mutli-view Video Coding", Joint Video Team (JVT) of ISO/IEC MPEG&ITU-T VCEG (ISO/IEC JTC/SC29/WG11 and ITU-T SG16 Q6), No. M12874, Jan. 12, 2006, XP030041543.

Martinian, Emin et al.: "Mutliview Video Compression Using V Frames", Joint Video Team (JVT) of ISO/IEC PEG & ITU-T VCEG (ISO/IEC JTC/SC29/WG11 and ITU-T SG16 Q6), No. M12828, Jan. 11, 2006, XP030042026.

Lee, SangHeon et al.: "HR/LR Hybrid Structure for MVC", Joint Video Team (JVT) of ISO/IEC MPEG & ITU-T VCEG (ISO/IEC JTC1/SC29/WG11 and ITU-T SG16 Q6), No. M13357, Mar. 29, 2006, XP030042026.

Taiwan Office Action dated Jan. 28, 2011 issued in corresponding Taiwanese Application No. 096122161 and English translation thereof.

Korean Notice of Allowance dated Feb. 4, 2010 for corresponding Application No. 9-5-2010-005145282.

International Search Report issued Dec. 21, 2007 in counterpart International Patent Application No. PCT/KR2007/004116.

International Search Report issued Aug. 6, 2007 in counterpart International Patent Application No. PCT/KR2007/001580.

Russian Notice of Allowance dated Jan. 20, 2010 for corresponding Application No. 2008142963.

Ralf Schafer et al. MCTF and scalability extension of H.264/AVC and its application to video transmission, storage, and surveillance, Visual Communications and Image Processing 2005, Proceedings of the SPIE, vol. 5960, pp. 343-354.

Joint Video Team (JVT) of ISO/IEC MPEG & ITU-T VCEG, Extended Spatial Scalability with picture-level adaptation, JVT-O008, 15-th meeting: Bussan, Apr. 16-22, 2005, pp. 1-20.

ISO/IEC JTC1/SC29 WG11, MPEG2005/M12345, Jul. 2005, Poznan, Poland.

U.S. Office Action dated Mar. 31, 2010 for corresponding U.S. Appl. No. 12/604,718.

Korean Notice of Allowance for corresponding Application No. 10-2009-7017177 dated Apr. 20, 2010.

European Search Report for corresponding Application No. 07745744.8 dated May 7, 2010.

Mueller K et al: "Multiview Coding using AVC" Joint Video Team (JVT) of ISO/IEC MPEG & ITU-T VCEG (ISO/IEC JTC/SC29/WG11 and ITU-T SG16 Q6), No. M12945, Jan. 11, 2006, XP030041614.

Mueller et al., "Multiview Coding using AVC," Joint Video Team (JVT) of ISO/IEC MPEG & ITU-T VCEG (ISO/IEC JTC1/SC29/WG11 and ITU-T SG16 Q6), No. M12945, Jan. 11, 2006, XP030041614.

English Translation of Notice of Allowance for corresponding Korean Application No. 10-2009-7017177 dated Apr. 20, 2010.

J. Reichel et al., "Scalable Video Coding Working Draft 3," Joint Video Team (JVT) of ISO/IEC MPEG & ITU-T VCEG (ISO/IEC JTC1/SC29/WG11 and ITU-T SG16 Q6), No. JVT-P201, Jul. 29, 2005, XP030006150.

Jeong-Hyu Yang et al., "Illumination Compensation Scheme for MVC based on Intra Offset Prediction," Joint Video Team (JVT) of ISO/IEC MPEG & ITU-T VCEG (ISO/IEC JTC/SC29/WG11 and ITU-T SG16 Q6), No. M13361, Apr. 2006, XP030042030.

Jeong-Hyu Yang, "Results on CE2 in Multiview Video Coding," Joint Video Team (JVT) of ISO/IEC MPEG & ITU-T VCEG (ISO/IEC JTC/SC29/WG11 and ITU-T SG16 Q6), No. M13621, Jul. 12, 2006, XP030042290.

Joaquin Lopez et al., "Block-Based Illumination Compensation and Search Techniques for Multiview Video Coding," Proceedings of the Picture Coding Symposium, Dec. 15, 2004, pp. 1-6, XP002437841.

"Survey of Algorithms used for Multi-view Video Coding (MVC)," Joint Video Team (JVT) of ISO/IEC MPEG & ITU-T VCEG (ISO/IEC JTC1/SC29/WG11 and ITU-T SG16 Q6), No. N6909, Jan. 21, 2005, XP030013629.

H-S Koo et al., "MVC Motion Skip Mode," Joint Video Team (JVT) of ISO/IEC MPEG & ITU-T VCEG (ISO/IEC JTC/SC29/WG11 and ITU-T SG16 Q6), No. JVT-W081, Apr. 19, 2007, XP030007041.
Search Report for corresponding European Application No. 07745746.3 dated Jan. 8, 2010.
Search Report for corresponding European Application No. 07745745.5 dated Jan. 20, 2010.
Search Report for corresponding European Application No. 07746998.9 dated Jan. 20, 2010.
Chinese Office Action dated Sep. 1, 2010 issued in corresponding Chinese application No. 200780018827.3 and English translation thereof.
Yang, et al., "Illumination Compensation Scheme for MVC based on Intra Offset Prediction" International Organisation for Standardisation Coding of Moving Pictures and Audio, ISO/IECJTC1/SC29/WG11, M13361, Switzerland, Apr. 2006.

U.S. Office Action dated Nov. 4, 2011 issued in corresponding U.S. Appl. No. 12/225,688.
Taiwanese Office Action dated Oct. 12, 2011 issued in corresponding Taiwanese Application No. 096131964.
Office Action for corresponding U.S. Appl. No. 12/805,745 dated Mar. 29, 2012.
Office Action for corresponding U.S. Appl. No. 12/225,732 dated May 8, 2012.
U.S. Office Action dated Jan. 17, 2012 issued in corresponding U.S. Appl. No. 12/588,447.
US Office Action dated Feb. 22, 2012 for corresponding U.S. Appl. No. 12/805,792.
US Office Action dated Feb. 22, 2012 for corresponding U.S. Appl. No. 12/585,558.

* cited by examiner

A : GDV (a)

| slice_header( ) { | C | Descriptor |
|---|---|---|
| ... | | |
| slice_type | 2 | ue(v) |
| ... | | |
| if ( anchor_pic_flag ) { | | |
|   if( slice_type = = P | | slice_type = = B ) { | | |
|     for( compIdx = 0; compIdx < 2; compIdx++ ) | | |
|       global_disparity_mb_l0 [ compIdx ] | 2 | se(v) |
|   } | | |
|   if(( slice_type = = B ) { | | |
|     for( compIdx = 0; compIdx < 2; compIdx++ ) | | |
|       global_disparity_mb_l1 [ compIdx ] | 2 | se(v) |
|   } | | |
| } | | |
| ... | | |
| } | | |

FIG. 7

| slice_header( ) { | C | Descriptor |
|---|---|---|
| ... | | |
| slice_type | 2 | ue(v) |
| ... | | |
| if (view_dependency_non_anchor &&  anchor_pic_flag && view_dependency_anchor ) { | | |
| if( slice_type = = P || slice_type = = B ) { | | |
| for( compIdx = 0; compIdx < 2; compIdx++ ) | | |
| global_disparity_mb_l0 [ compIdx ] | 2 | se(v) |
| } | | |
| if(( slice_type = = B ) { | | |
| for( compIdx = 0; compIdx < 2; compIdx++ ) | | |
| global_disparity_mb_l1 [ compIdx ] | 2 | se(v) |
| } | | |
| } | | |
| ... | 2 | ue(v) |
| } | | |

FIG. 16

| macroblock_layer( ) { | C | Descriptor |
|---|---|---|
| if ( ! anchor_pic_flag ) { | | |
| motion_skip_flag | 2 | u(1) \| ae(v) |
| } | | |
| if (! motion_skip_flag) { | | |
| mb_type | 2 | ue(v) \| ae(v) |
| if( mb_type == I_PCM ) { | | |
| ... | | |
| } else { | | |
| ... | 2 | u(v) |
| mb_pred( mb_type ) | | |
| ... | | |
| } | | |
| } | | |

FIG. 17

| macroblock_layer( ) { | C | Descriptor |
|---|---|---|
| if (view_dependency_non_anchor && ! anchor_pic_flag&& view_dependency_anchor) { | | |
| motion_skip_flag | 2 | u(1) \| ae(v) |
| } | | |
| if (! motion_skip_flag) { | | |
| mb_type | 2 | ue(v) \| ae(v) |
| if( mb_type == I_PCM ) { | | |
| ... | | |
| } else { | | |
| ... | 2 | u(v) |
| mb_pred( mb_type ) | | |
| ... | | |
| } | | |
| } | | |

FIG. 18

| motion_skip_flag | meaning |
|---|---|
| 0 | Not motion skip mode |
| 1 | Motion skip mode |

FIG. 19

| motion_skip_flag | meaning |
|---|---|
| 0 | Not motion skip mode |
| 1 | Motion skip mode, Forward |
| 2 | Motion skip mode, Backward |

METHOD AND APPARATUS FOR PROCESSING A VIDEO SIGNAL

This application is a National Phase entry of PCT Application number PCT/KR2007/002964 filed on Jun. 19, 2007, which claims priority under 35 U.S.C. §§119(e), 120 and 365(c) to U.S. Provisional Application No. 60/814,561, filed on Jun. 19, 2006, U.S. Provisional Application No. 60/830,685, filed Jul. 14, 2006, U.S. Provisional Application No. 60/830,599, filed on Jul. 14, 2006, U.S. Provisional Application No. 60/832,153, filed on Jul. 21, 2006, U.S. Provisional Application No. 60/842,151, filed on Sep. 5, 2006, U.S. Provisional Application No.60/852,700, filed on Oct. 19, 2006, U.S. Provisional Application No. 60/853,775, filed on Oct. 24, 2006, U.S. Provisional Application No. 60/868,310, filed on Dec. 1, 2006, U.S. Provisional Application No. 60/907,807, filed on Apr. 18, 2007, U.S. Provisional Application No. 60/924,602, filed on May 22, 2007, and U.S. Provisional Application No. 60/929,046, filed on Jun. 8, 2007, the disclosure of each of which is incorporated herein in its entirety by reference.

TECHNICAL FIELD

The present invention relates to video signal processing, and more particularly, to a method for processing a video signal and apparatus thereof. Although the present invention is suitable for a wide scope of applications, it is particularly suitable for decoding video signals.

BACKGROUND ART

Generally, compression coding means a series of signal processing techniques for transferring digitalized information via a communication circuit or storing digitalized information in a format suitable for a storage medium. Targets of compression coding include audio, video, character, etc. In particular, a technique of performing compression coding on video is called video compression. Video is generally characterized in having spatial duplication and temporal duplication.

DISCLOSURE OF THE INVENTION

Technical Problem

However, if the spatial duplication and the temporal duplication are not sufficiently eliminated, a compression rate in coding a video signal is lowered.

If the spatial duplication and the temporal duplication are excessively eliminated, it is unable to generate information required for decoding a video signal to degrade a reconstruction ratio.

In a multi-view video signal, since inter-view pictures mostly have the difference caused by a camera position only, they tend to have very high relevance and duplication. In case that the duplication of the inter-view pictures is insufficiently or excessively eliminated, a compression rate or a reconstruction ratio is lowered.

Technical Solution

Accordingly, the present invention is directed to a method for processing a video signal and apparatus thereof that substantially obviate one or more of the problems due to limitations and disadvantages of the related art.

An object of the present invention is to provide a method for processing a video signal and apparatus thereof, by which duplication of inter-view pictures is eliminated to decode the video signal.

Another object of the present invention is to provide a method for processing a video signal and apparatus thereof, by which a global motion vector of a current picture is generated based on relevance between inter-view pictures to decode the video signal.

A further object of the present invention is to provide a method for processing a video signal and apparatus thereof, by which motion information for a current picture is obtained based on relevance between inter-view pictures to perform motion compensation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

Advantageous Effects

The present invention provides the following effects or advantages.

First of all, the present invention is able to partially omit motion vectors having high relevance in-between in coding a video signal, thereby raising a compression rate.

Secondly, the present invention is able to omit motion information having high duplication in coding a video signal, thereby raising a compression rate.

Thirdly, even if motion information for a current block is not transferred, the present invention can calculate another motion information very similar to the motion information for the current block, thereby enhancing a reconstruction ratio.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is a diagram of an example of syntax according to the method shown in FIG. 4;

FIG. 7 is a diagram of an example of syntax according to the method shown in FIG. 5;

FIG. 16 and FIG. 17 are diagrams of examples of syntax for motion skip mode; and FIG. 18 and FIG. 19 are diagrams of examples of the meaning of motion skip flag information.

BEST MODE

Figure 1:
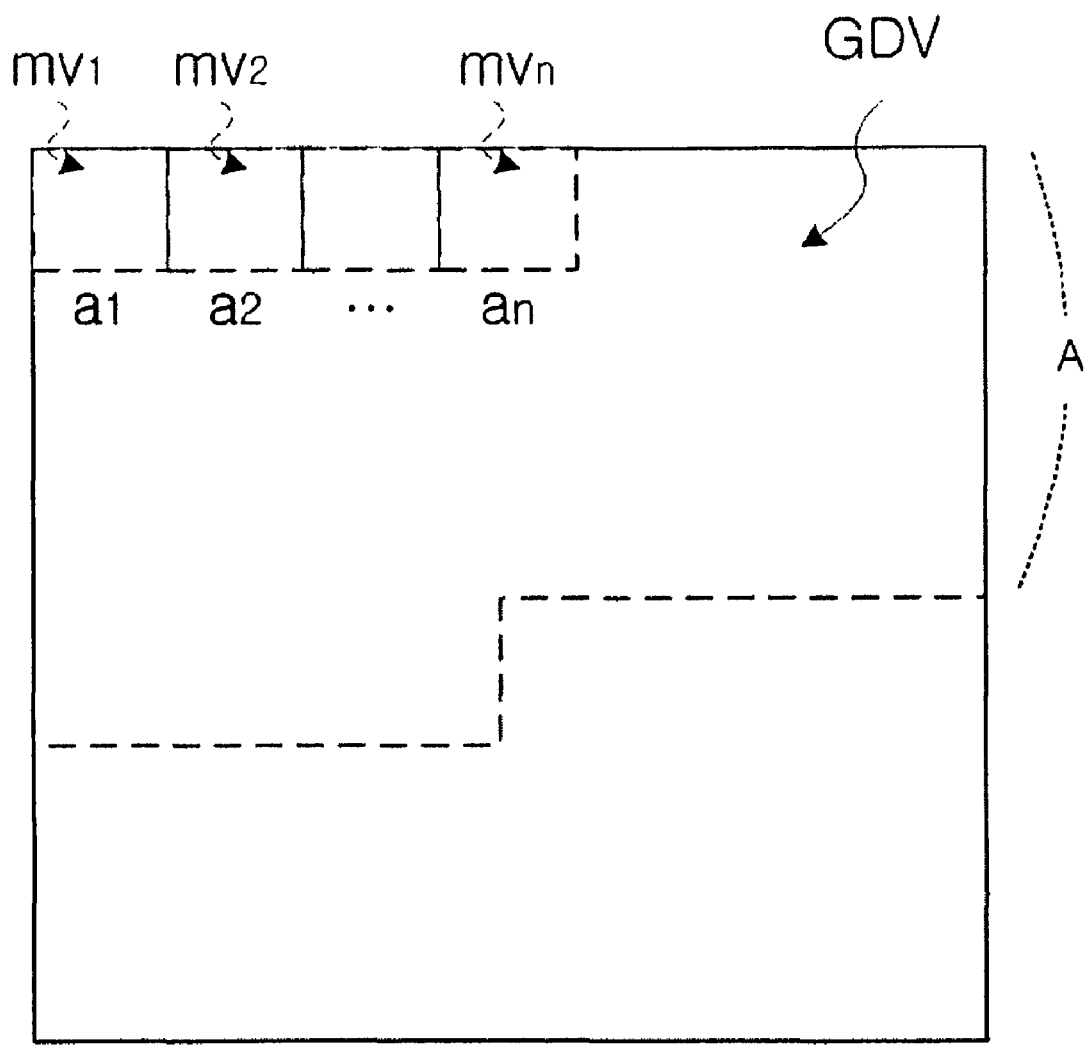
FIG. 1 is a diagram of a case that a global motion vector corresponds to a slice.

To achieve these and other advantages and in accordance with the purpose of the present invention, as embodied and broadly described, a method for processing a video signal according to the present invention includes the steps of extracting attribute information for a current block or attribute information for a current picture from the video signal, extracting motion skip information for the current block, and generating motion information for the current block using motion information for a reference block according to the attribute information and the motion skip information.

To further achieve these and other advantages and in accordance with the purpose of the present invention, a method for processing a video signal according to the present invention includes the steps of extracting at least one global motion vector corresponding to a picture on a first domain having a current block located thereon from the video signal, obtaining temporal information for the picture on the first domain, and generating a global motion vector of a current picture using the at least one global motion vector and the temporal information for the picture on the first domain, wherein the global motion vector corresponds to at least one block within the picture on the first domain.

To further achieve these and other advantages and in accordance with the purpose of the present invention, a method for processing a video signal according to the present invention includes the steps of extracting unit extracting at least one global motion vector corresponding to a picture on a first domain having a current block located thereon and generating a global motion vector of a current picture using a latest extracted one of the at least one global motion vector, wherein the global motion vector corresponds to at least one block within the picture on the first domain.

To further achieve these and other advantages and in accordance with the purpose of the present invention, a method for processing a video signal according to the present invention includes the steps of extracting priority information for a bitstream corresponding to a current block, if the bitstream is parsed according to the priority information, extracting at least one global motion vector corresponding to a picture on a first domain having the current block located thereon, and generating a global motion vector of a current picture using the at least one global motion vector, wherein the global motion vector corresponds to at least one block within the picture on the first domain.

To further achieve these and other advantages and in accordance with the purpose of the present invention, a method for processing a video signal according to the present invention includes the steps of searching a reference block corresponding to a current block, obtaining motion information for the reference block from the video signal, generating motion information for the current block using the motion information for the reference block, calculating a predictive value of the current block using the motion information for the current block, and reconstructing the current block using the predictive value of the current block, wherein the reference block is located at a position moved from a same position of the current block by a global motion vector of a current picture.

It is to be understood that both the foregoing general description and the following detailed description are exemplary and explanatory and are intended to provide further explanation of the invention as claimed.

Mode For Invention

Reference will now be made in detail to the preferred embodiments of the present invention, examples of which are illustrated in the accompanying drawings.

First of all, motion information in the present invention should be construed as a concept that includes interview-direction motion information as well as temporal-direction motion information. Furthermore, a motion vector should be construed as a concept that includes interview direction disparity offset as well as temporal-direction motion offset.

A first domain is not limited to a temporal direction.

A picture on the first domain is not limited to a group of pictures having the same view. A second domain is not limited to an interview direction (or spatial direction). A picture on the second domain is not limited to a group of pictures having the same temporal instance.

Explained in the following description are a concept of global motion vector or a global disparity vector (hereinafter abbreviated GDV) and a method of deriving a global motion vector of a current picture using a global motion picture of another motion picture in case that the global motion vector of the current picture (or slice) is not transmitted. Subsequently, explained in the following description are a method of generating motion information for a current block using motion information of a neighbor view in case that the motion information (macroblock type, reference picture index, motion vector, etc.) for the current block is not transmitted, i.e., in case of a motion skip mode.

1. Global Motion Vector (GDV) Derivation 1.1 Concept, Type and Transmitting Method of Global Motion Vector Compared to a motion vector corresponding to a local area (e.g., macroblock, block, pixel, etc.), a global motion vector or a global disparity vector (hereinafter GDV) is a sort of motion vector that corresponds to a whole area including the local area. In this case, the whole area can correspond to a single slice, a single picture or a whole sequence. In some cases, the whole area can corresponds to at least one object area or background.

Meanwhile, a motion vector can have a value of a pixel unit or ¼ pixel unit. Yet, a global motion vector (GDV) can have a value of a pixel unit or ¼ pixel unit or a value of 4×4 unit, 8×8 unit or macroblock unit.

A global motion vector can be transmitted in various ways. A global vector can be transmitted for each slice within a picture or for each picture. A global motion vector can be transmitted for each slice just in case of anchor picture. A global motion vector can be transmitted for each slice of anchor picture only if there is view dependency of non-anchor picture.

In the following description, a concept of global motion vector is explained with reference to FIG. 1 and FIG. 2. And, various methods of transmitting global motion vectors are explained with reference to FIGS. 3 to 5.

Figure 2:
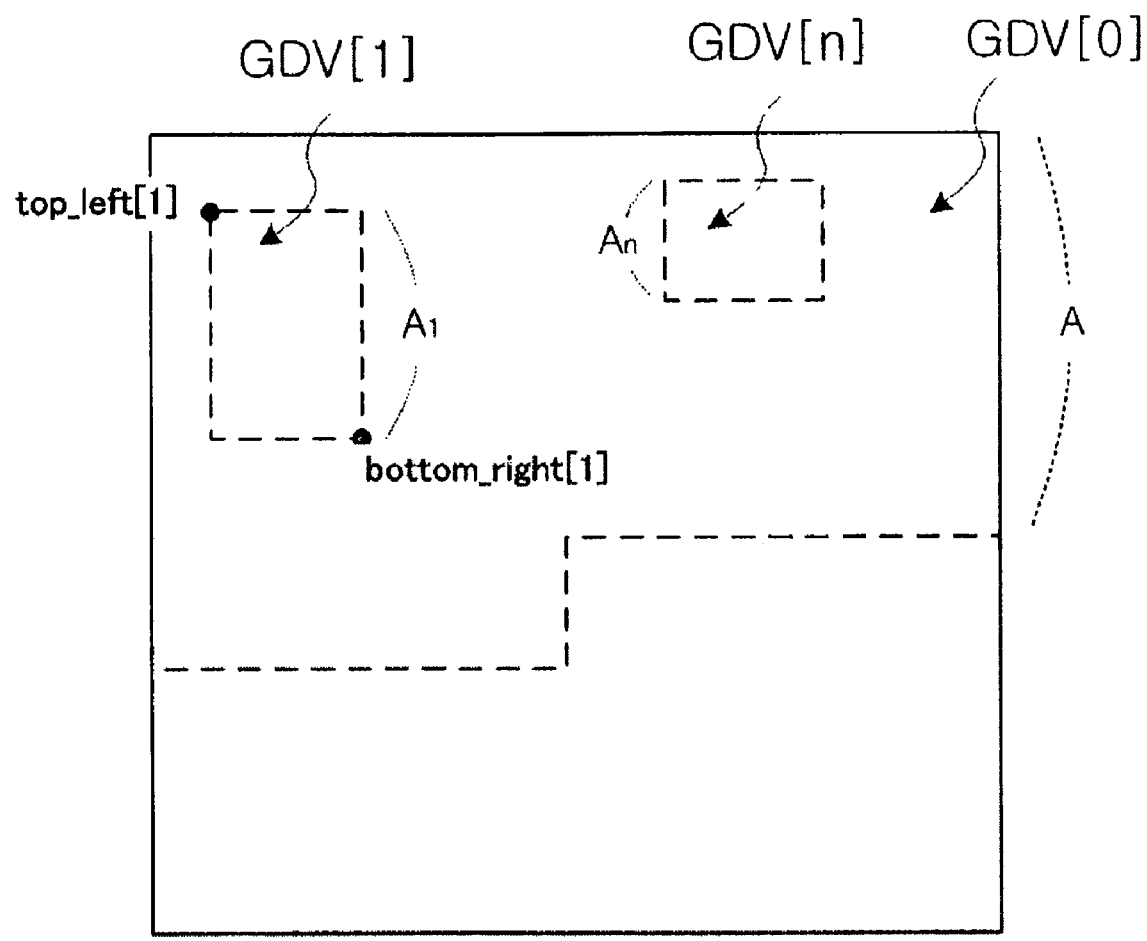
FIG. 2 is a diagram of a case that a global motion vector corresponds to an object or a background within a picture.

FIG. 1 is a diagram of a case that a global motion vector corresponds to a slice, and FIG. 2 is a diagram of a case that a global motion vector corresponds to an object or a background within a picture.

Referring to FIG. 1, a motion vector (mv) corresponds to a macroblock ($a_1, a_2, a_3, \ldots$). Yet, a global motion vector (GDV) is a motion vector corresponding to a slice (A).

Referring to FIG. 2, object areas ($A_1, A_2, \ldots$) exist within a single slice (A). The object areas ($A_1, A_2, \ldots$) can be specified as a left top position top_left[n] or a right bottom position bottom_right[n]. Global motion vectors GDV91] and GDV[n] exist to correspond to the object areas ($A_1, A_2, \ldots$). And, a global motion vector GDV[0] exists to correspond to a background excluding the object areas.

Figure 3:
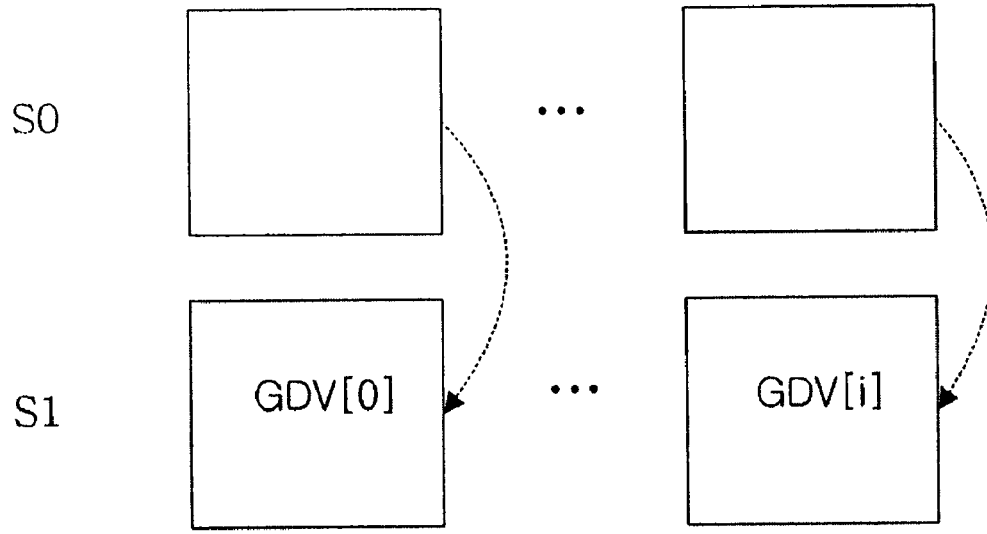
FIGS. 3 to 5 are diagrams of various transmitting methods of global motion vectors.
Figure 3:
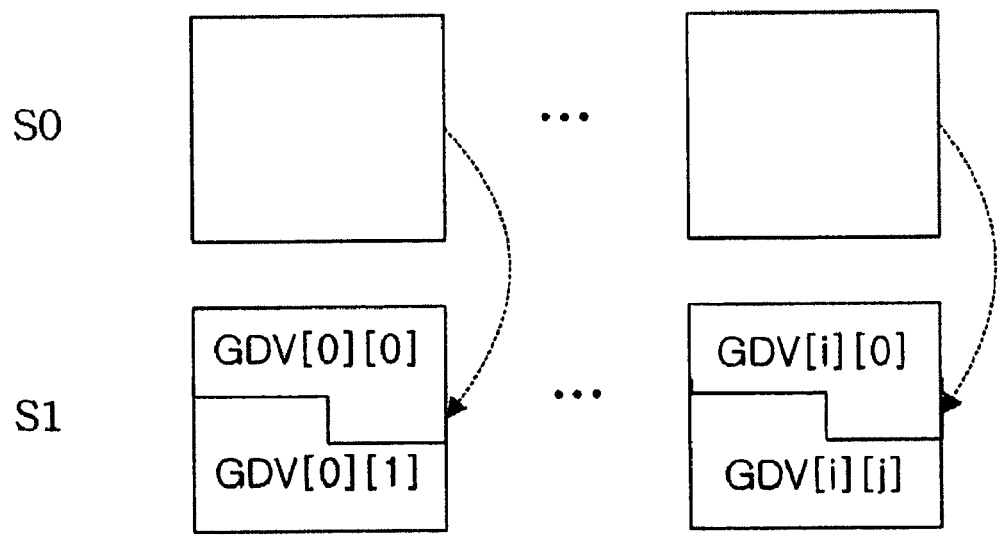
Figure 4:
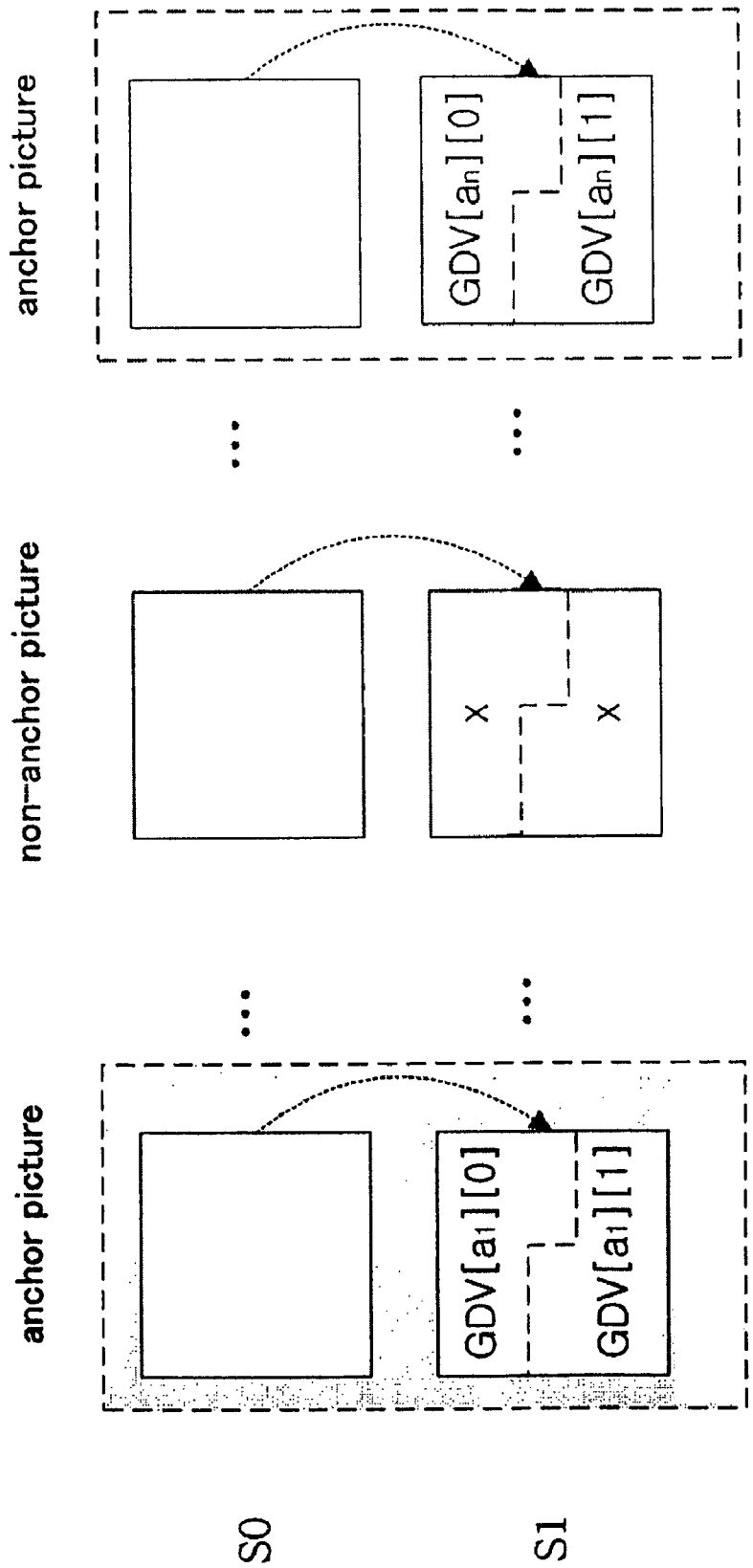
Figure 5:
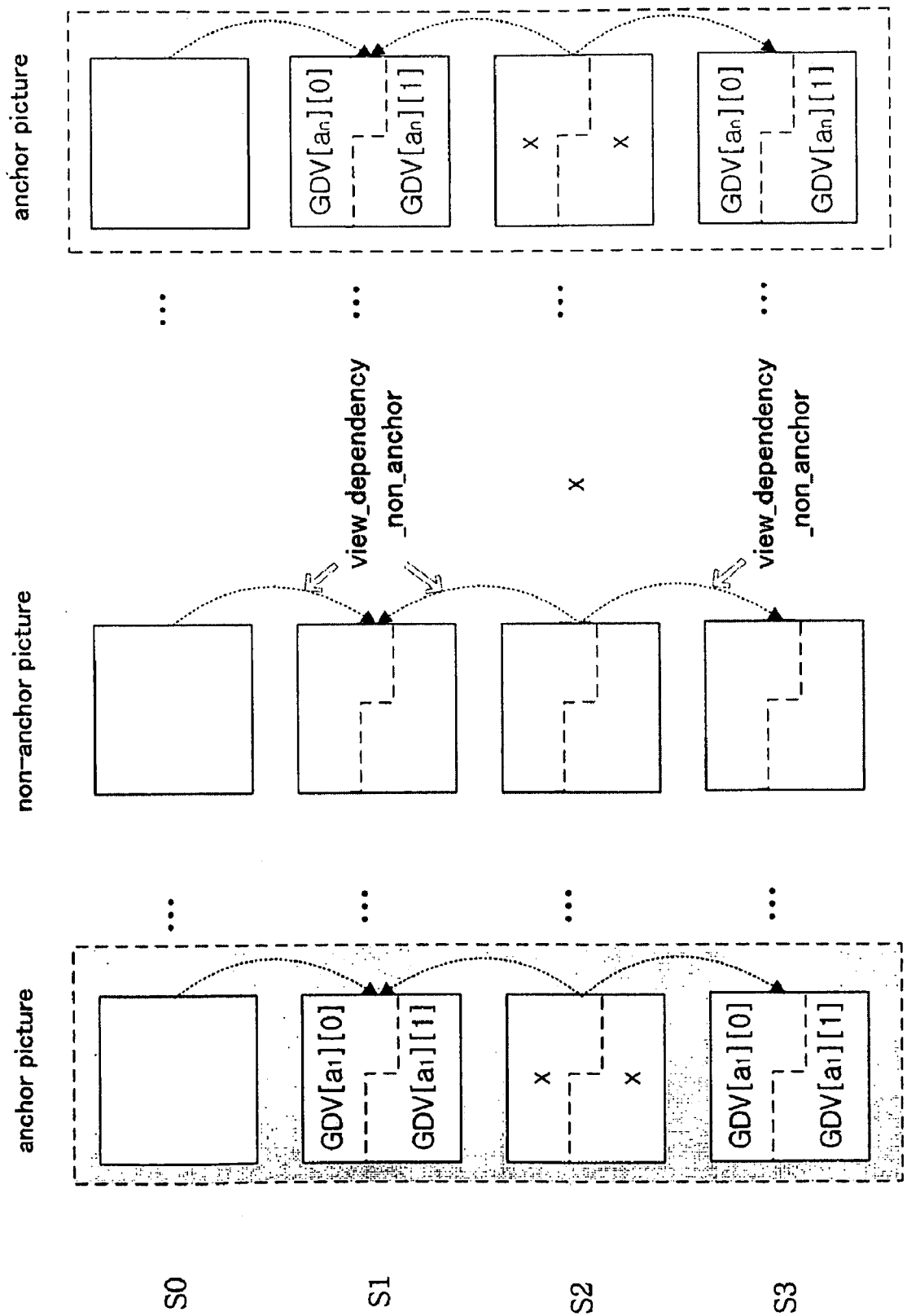

FIGS. 3 to 5 are diagrams of various transmitting methods of global motion vectors.

Referring to (a) of FIG. 3, a global motion vector GDV[i] (where i indicates a picture index) (in case of bi-prediction, two global motion vectors) is transmitted for each picture.

Referring to (b) of FIG. 3, in case that at least one slice is included in a picture, a global motion vector GDV[i][j] (where j indicates a slice index) (in case of bi-prediction, two global motion vectors) is transmitted for each picture.

Referring to FIG. 4, in case of an anchor picture among pictures, a global motion vector GDV[$a_n$][j] (where $a_n$ indicates an anchor picture index) (in case of bi-prediction, two global motion vectors) is transmitted. In case of non-anchor picture, a global motion vector is not transmitted. FIG. 6 shows an example of syntax for the case of transmitting a global motion vector by the method shown in FIG. 4.

Referring to FIG. 6, slice type information slice_type is included in a slice header mvc_header( ). On the condition that a picture to which a current slice belongs is an anchor picture, a single global motion vector global_disparity_mb_10[compIdx] is transmitted if a slice type is P. On the same condition, two global motion vectors global_disparity_mb_11[compIdx] are transmitted if a slice type is B.

Referring to FIG. 5, like the method shown in FIG. 4, a global motion vector GDV[$a_n$][j] is transmitted in case of an anchor picture. Instead of transmitting for all views S0, S1, S2 and S3, the global motion vector is transmitted only if there exists view dependency of a non-anchor picture view_dependency_non_anchor at a view to which the anchor picture belongs (S1, S3) (i.e., in case that the non-anchor picture refers to a picture at a different view). In case of views where view dependency of non-anchor picture view_dependency_non_anchor does not exist (S0, S2), a global motion vector is not transmitted. The method shown in FIG. 5 is useful for the case that a global motion vector is used for a motion skip mode only without being used for other usages. This will be explained in the following description of the motion skip mode later. FIG. 7 shows an example of syntax in case of transmitting a global motion vector by the method shown in FIG. 5.

Referring to FIG. 7, the syntax is almost as good as the former syntax shown in FIG. 6. There exists a difference in that view dependency of non-anchor picture view_dependency_non_anchor is added to the condition for transmitting a global motion vector. And, the condition of view dependency of anchor picture view_dependency_anchor is added to indicate whether an anchor picture refers to a picture at a different view, which can be a necessary condition for extracting a global motion vector of the anchor picture. Details of the view dependency shall be explained in '2.1 Motion Skip Mode Determining Process'.

Explained in the following description is a process for deriving a global motion vector of non-anchor picture using a global motion vector of anchor picture in case that the global motion picture is transmitted by the method shown in FIG. 4 or FIG. 5, i.e., in case that a global motion vector is not transmitted in case of non-anchor picture.

1.2 Extraction and Derivation of Global Motion Vector

Figure 8:
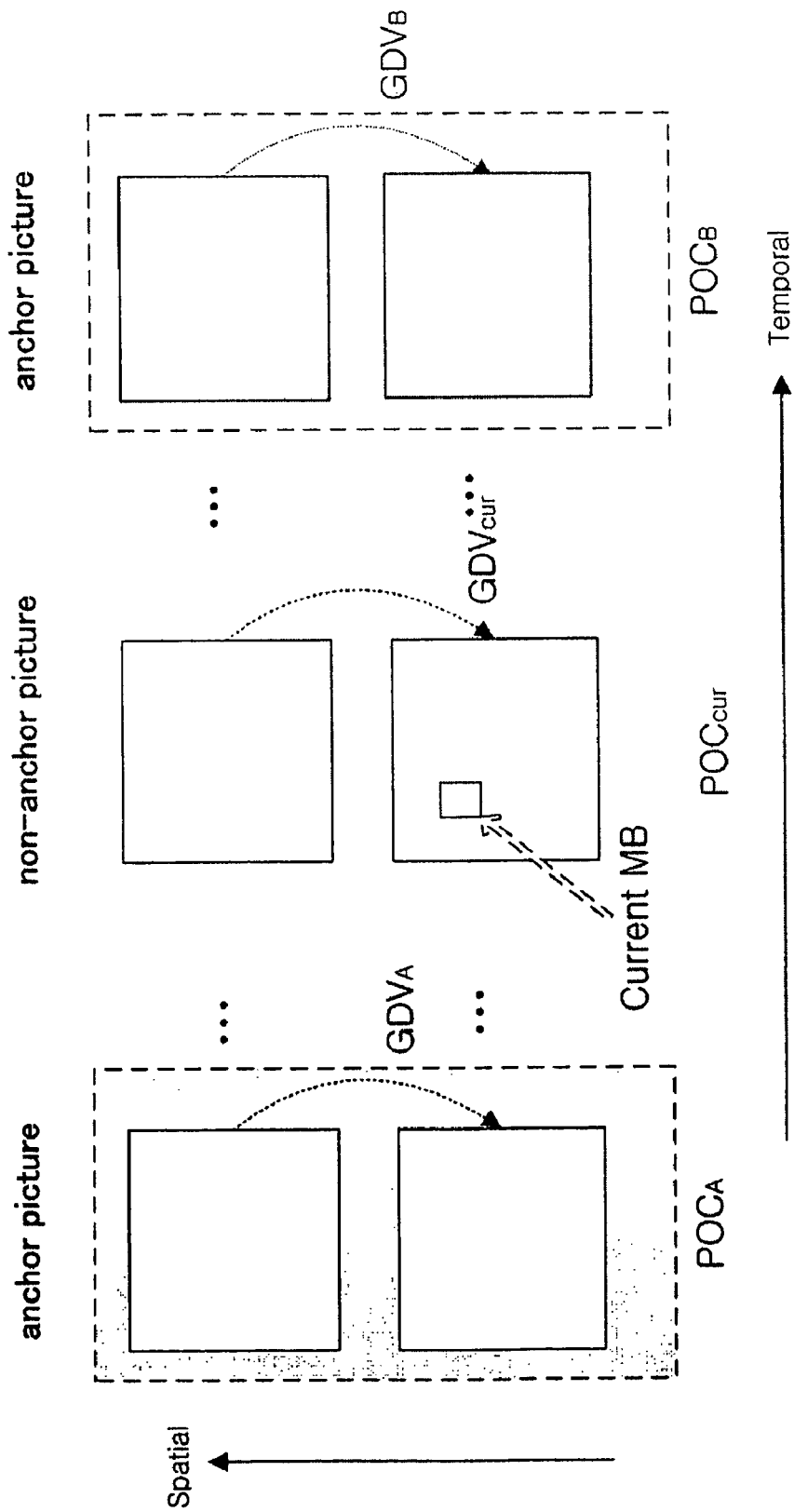
FIG. 8 is a diagram to explain a concept of a video signal processing method according to one embodiment of the present invention.
Figure 9:
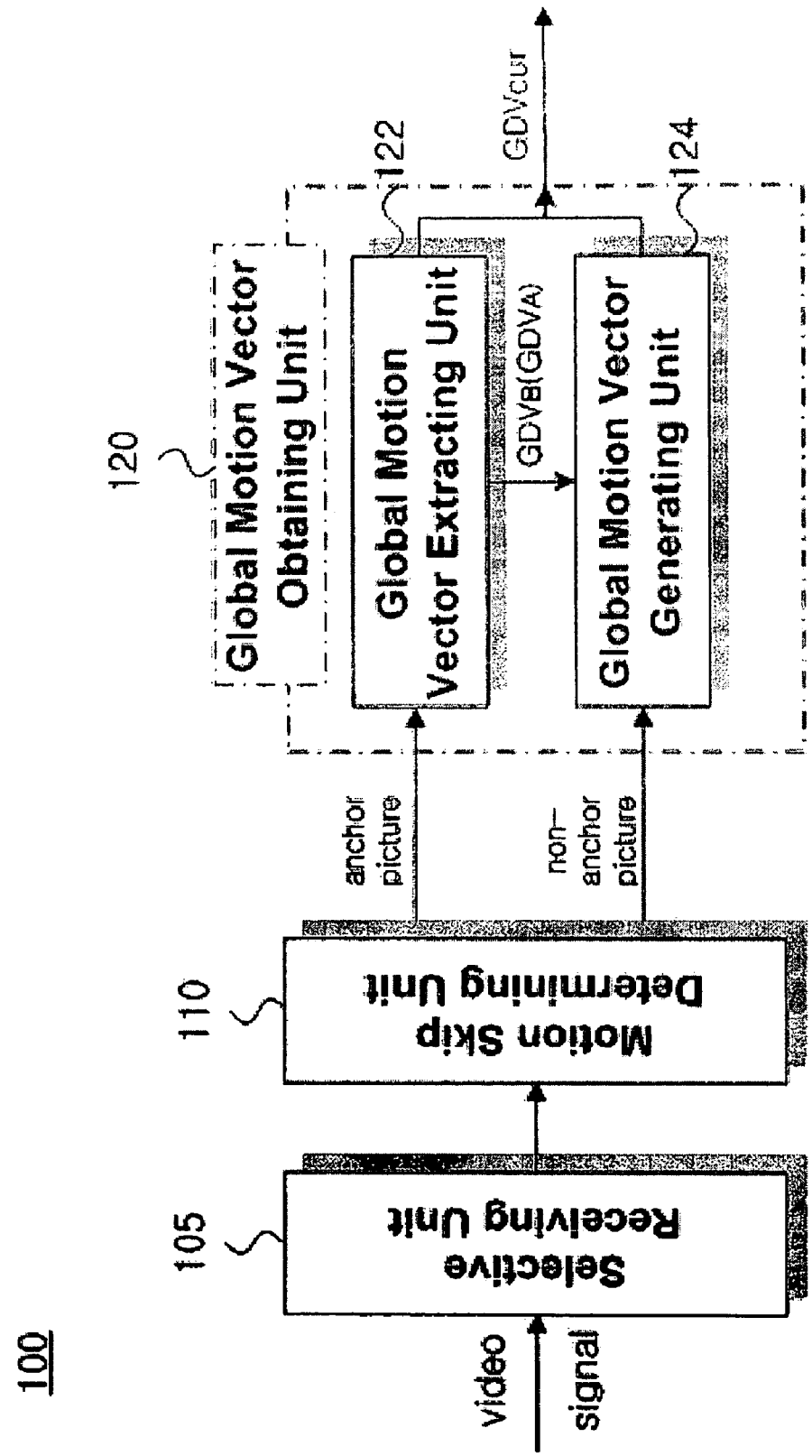
FIG. 9 is a block diagram of a video signal processing apparatus according to one embodiment of the present invention.
Figure 10:
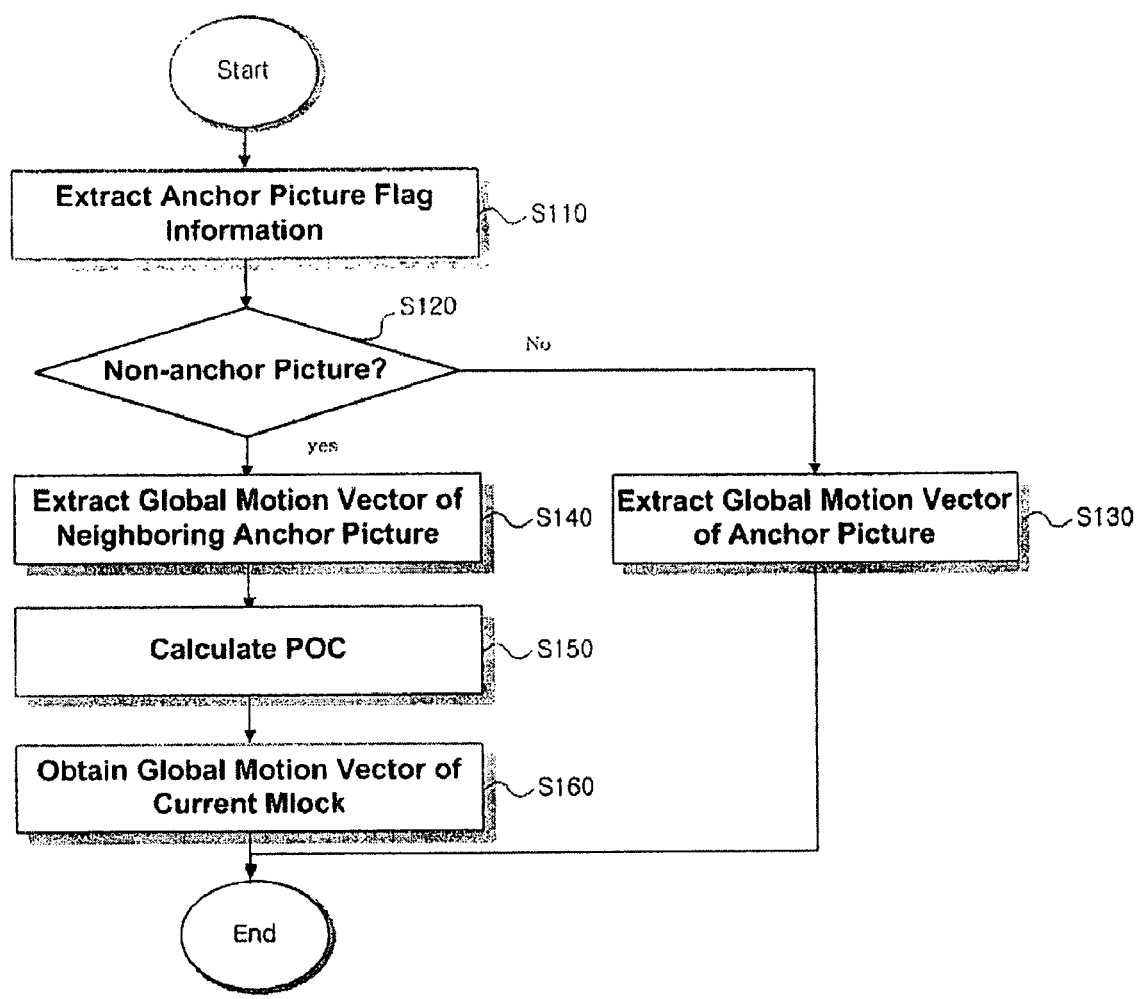
FIG. 10 is a flowchart of a video signal processing method according to one embodiment of the present invention.

FIG. 8 is a diagram to explain a concept of a video signal processing method according to one embodiment of the present invention, FIG. 9 is a block diagram of a video signal processing apparatus according to one embodiment of the present invention, and FIG. 10 is a flowchart of a video signal processing method according to one embodiment of the present invention.

Referring to FIG. 8, since a current block (Current MB) corresponds to a non-anchor picture, a global motion vector of a current picture is not transmitted. Instead, a global motion vector $GDV_A$ of a temporal forward neighboring anchor picture and a global motion vector $GDV_B$ of a temporal backward neighboring anchor picture are transmitted. In this case, a process for generating a global motion vector $GDV_{cur}$ of a current picture using at least one of the global motion vectors $GDV_A$ and $GDV_B$ of the neighboring anchor pictures is explained in detail with reference to FIG. 9 and FIG. 10 as follows.

Referring to FIG. 9 and FIG. 10, a selective receiving unit 105 of a video signal processing apparatus 100 according to one embodiment of the present invention receives a bitstream corresponding to a case that a priority of a bitstream or a reception unit is (equal to or) higher than a preset priority based on priority information for the bitstream or the reception unit (not shown in the drawing). In this case, it is able to set the priority as higher if the priority information gets a lower value.

For example, priority information of 5 is set to have a priority higher than that of priority information of 4. In this case, if preset priority information is '5', the selective receiving unit 105 receives a bitstream having priority information equal to or smaller than '5' (e.g., 0, 1, 2, 3 or 4) only and does not receive a bitstream having priority information equal to or greater than '6'.

Thus, the bitstream received by the selective receiving unit 105 is inputted to a picture information extracting unit 110.

The picture information extracting unit 110 extracts anchor picture flag information (anchor_pic_flag) (S110).

The picture information extracting unit 110 then decides whether a current picture is an anchor picture based on the anchor picture flag information (S120).

If the current picture is the anchor picture ('No' in the step S120), a global motion vector extracting unit 122 extract the global motion vector of the current picture (anchor picture) and then ends the procedure (S130).

If the current picture is not the anchor picture ('Yes' in the step S120), a global motion vector generating unit 124 searches neighboring anchor pictures neighboring to the current picture and then extracts global motion vectors $GDV_A$ and $GDV_B$ of the searched neighboring anchor pictures (S140).

If necessary, the global motion vector generating unit 124 calculates a picture order count (POC: $POC_{cur}$; $POC_A$; and $POC_B$) of the current picture and the neighboring anchor picture(s) (S150).

Subsequently, the global motion vector generating unit 124 generates a global motion vector $GDV_{cur}$ of the current picture using the global motion vectors $GDV_A$ and $GDV_B$ extracted in the step S140 (and the picture order count (POC: $POC_{cur}$; $POC_A$; and $POC_K$) calculated in the step S150)

(S160). In the step S160, various methods are usable in generating the global motion vector $GDV_{cur}$ of the current picture as follows.

First of all, referring to Formula 1, the global motion vector $GDV_{cur}$ of the current picture results from multiplying a global motion vector $GDV_{prev}$ of an anchor picture by a constant (c).

The global motion vector $GDV_{prev}$ of the anchor picture can be: 1) a global motion vector of a latest extracted anchor picture; or 2) a global motion vector ($GDV_B$ or $GDV_A$) of a temporal backward or forward neighboring anchor picture). In this case, to decide the 'forward' or 'backward', it is able to consider the picture order count (POC: $POC_{cur}$; $POC_A$; and $POC_B$), which does not put limitation on the present invention.

And, the constant (c) can be a preset value or a value calculated using the picture order count ($POC_{cur}$, $POC_B$).

Thus, the method according to Formula 1 is advantageous in a calculation amount and data storage capacity.

$$GDV_{cur} = c * GDV_{prev} \quad \text{[Formula 1]}$$

Secondly, referring to Formula 2, a neighboring extent ($POC_{cur}$-$POC_A$ or $POC_B$-$POC_A$) between a current picture and a neighboring picture is calculated using the picture order count (POC: $POC_{cur}$; $POC_A$; and $POC_B$) calculated in the step S150. A global motion vector $GDV_{cur}$ of the current picture can be generated using the neighboring extents and the global motion vectors GDVA and GDVB of the neighboring anchor pictures extracted in the step S140.

In case that a difference between a value of the global motion vector $GDV_A$ of the temporal forward neighboring anchor picture and a value of the global motion vector $GDV_B$ of the temporal backward neighboring anchor picture is considerably great, this method enables more precise calculation of the global motion vector of the current picture.

$$GDV_{cur} = GDV_A + \left[ \frac{POC_{cur} - POC_A}{POC_B - POC_A} \times (GDV_B - GDV_A) \right] \quad \text{[Formula 2]}$$

So far, the concept, various transmitting methods and deriving process of the global motion vector are explained in the above description.

In the following description, a motion skip mode for utilizing the global motion vector is explained in detail.

2. Motion Skip Mode

First of all, a motion skip mode according to the present invention is to enable a processor to generate motion information for a current picture by itself using another motion information for a different picture in case that motion information (e.g., block type, reference picture information, motion vector, etc.) required for inter-prediction is not transmitted. In particular, since interview pictures are the pictures of the same object taken by changing positions of a camera and have great similarity in-between, motion information of a current picture has considerable similarity to motion information for another view. Hence, in case of a multi-view video signal, the motion skip mode of the present invention can be advantageous.

A motion skip mode according to the present invention is explained in detail with reference to the accompanied drawings as follows.

Figure 11:
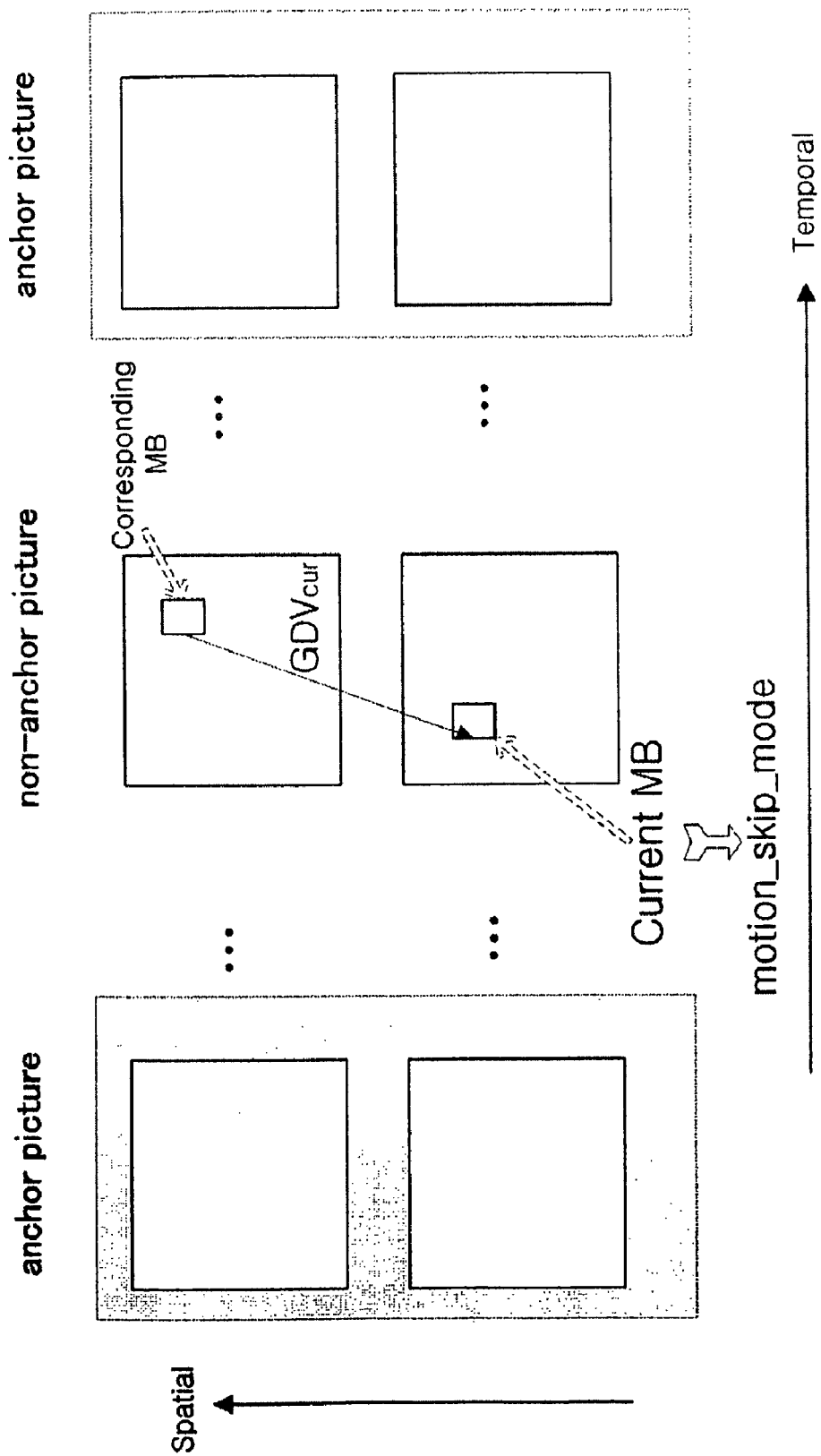
FIG. 11 is a diagram to explain a concept of a video signal processing method according to another embodiment of the present invention.
Figure 12:
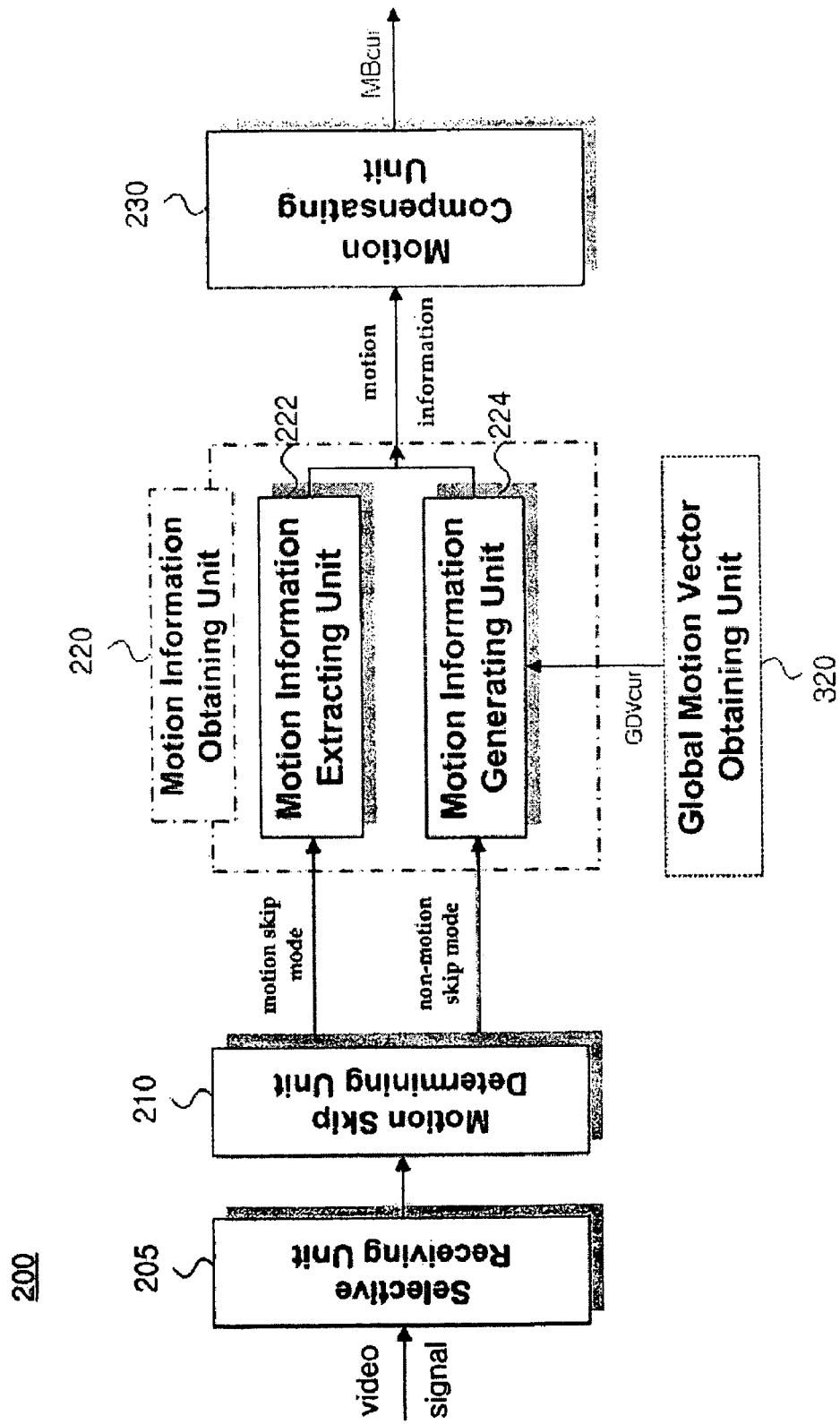
FIG. 12 is a block diagram of a video signal processing apparatus according to another embodiment of the present invention.
Figure 13:
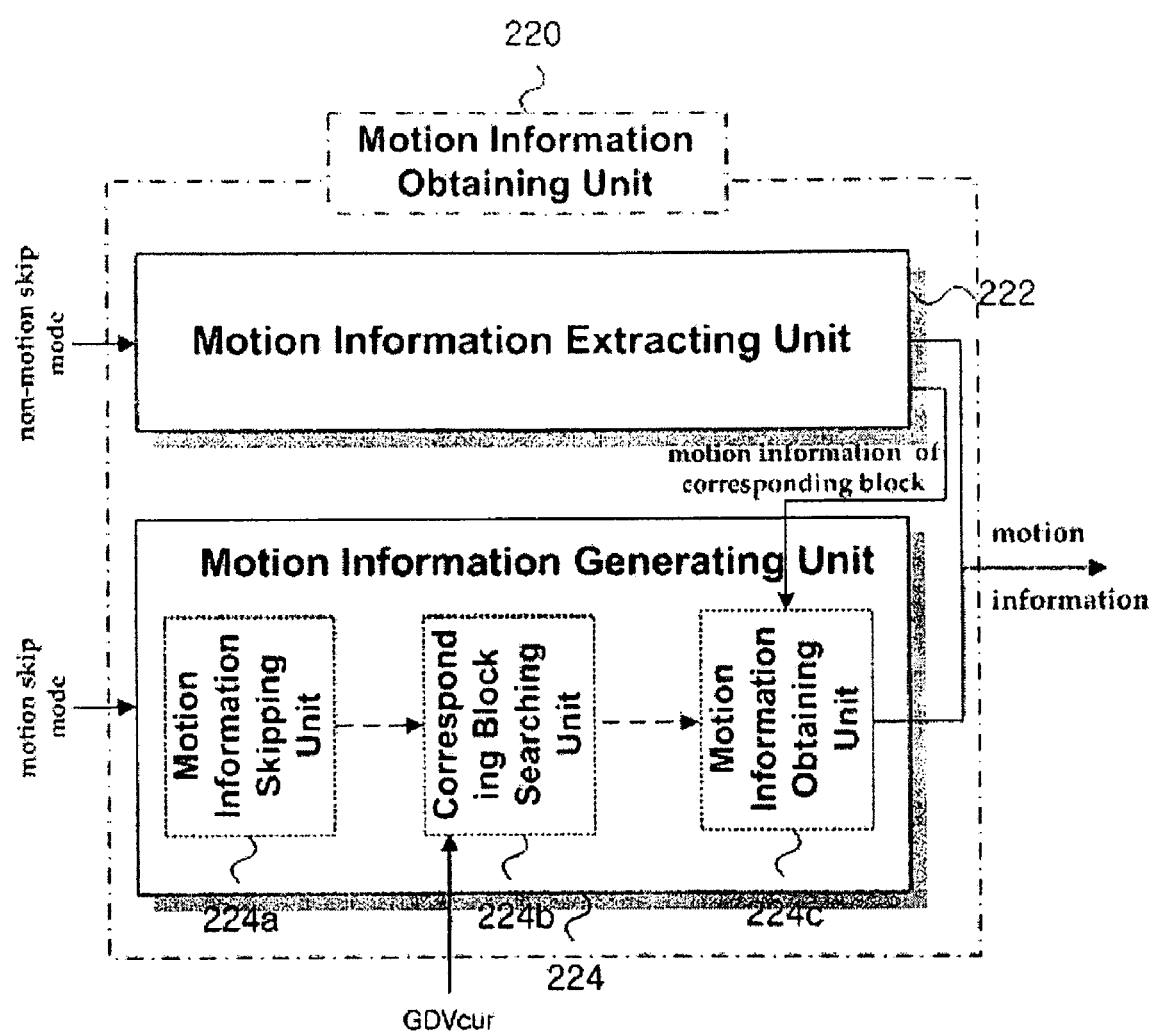
FIG. 13 is a detailed block diagram of a motion information obtaining unit shown in FIG. 12.
Figure 14:
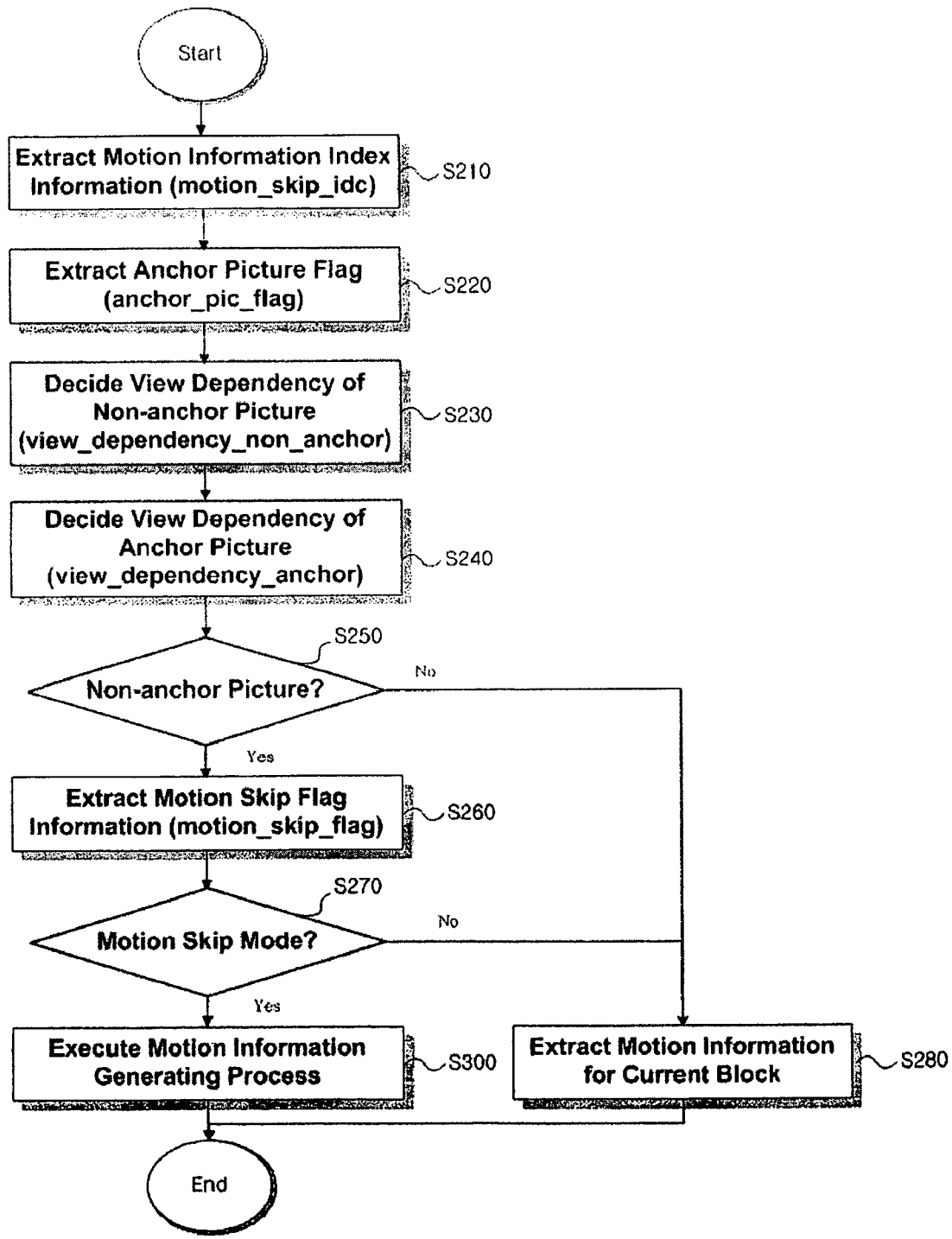
FIG. 14 is a flowchart of a video signal processing method according to another embodiment of the present invention.
Figure 15:
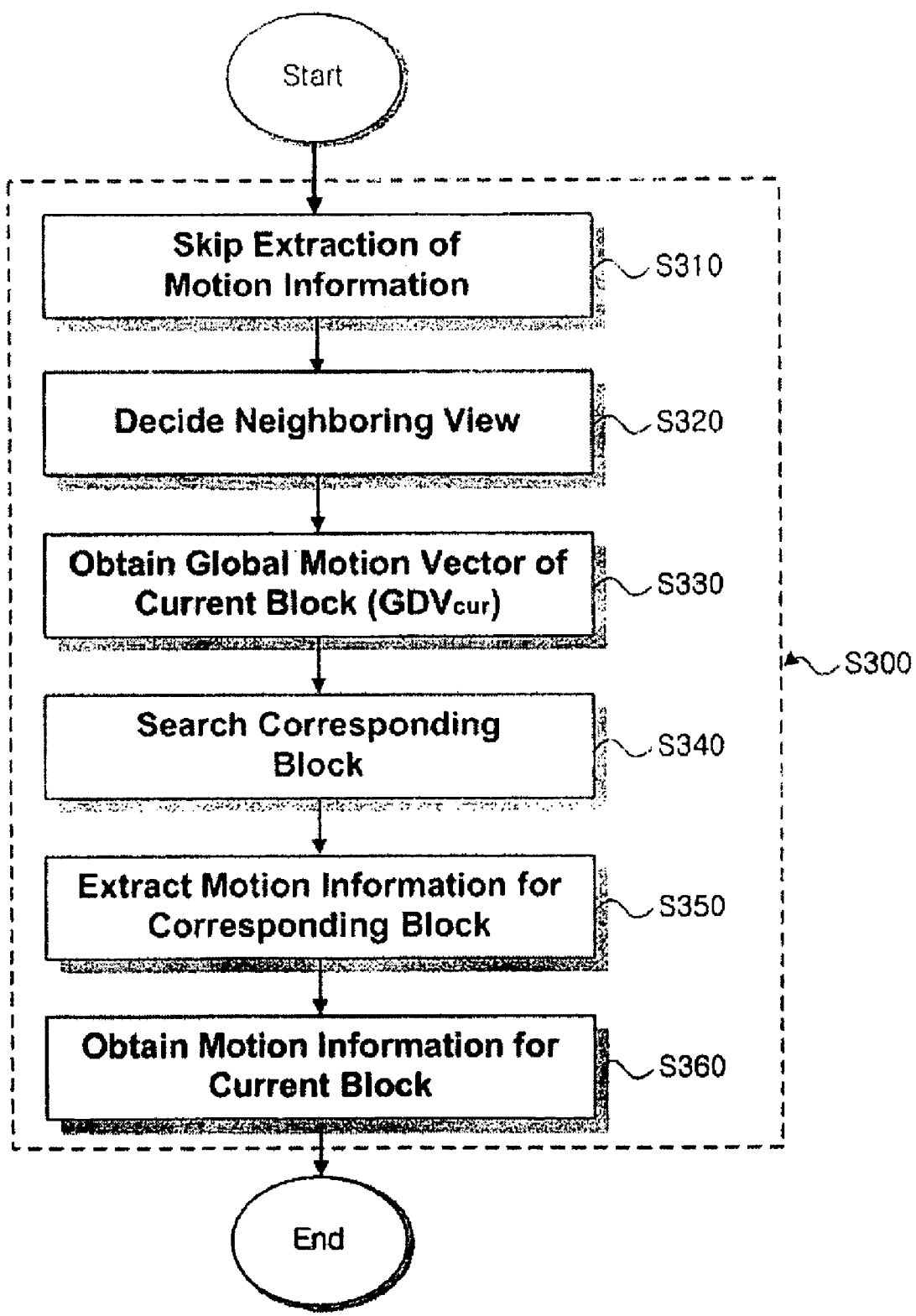
FIG. 15 is a detailed flowchart of a motion information generating step (S300) shown in FIG. 14.

FIG. 11 is a diagram to explain a concept of a video signal processing method according to another embodiment of the present invention, FIG. 12 is a block diagram of a video signal processing apparatus according to another embodiment of the present invention, FIG. 13 is a detailed block diagram of a motion information obtaining unit shown in FIG. 12, FIG. 14 is a flowchart of a video signal processing method according to another embodiment of the present invention, and FIG. 15 is a detailed flowchart of a motion information generating step (S300) shown in FIG. 14.

First of all, a concept of a motion skip mode according to the present invention is explained with reference to FIG. 11 as follows.

Referring to FIG. 11, in case that a current block (Current MB) is in a motion skip mode, a corresponding block (or a reference block) of a neighbor view is searched using a global motion vector $GDV_{cur}$ of a current picture and motion information for the corresponding block is then obtained.

Referring to FIG. 12 and FIG. 13, a video signal processing apparatus 200 according to another embodiment of the present invention includes a selective receiving unit 205, a motion skip determining unit 210, a motion information obtaining unit 220, a motion compensating unit 230, and a block reconstructing unit (not shown in the drawings). And, the apparatus 200 can be interconnected to a global motion vector obtaining unit 320. In this case, the motion information obtaining unit 220 includes a motion information extracting unit 222 and a motion information generating unit 224. The selective receiving unit 205 has the same configuration of the former selective receiving unit 105. A bitstream received by the selective receiving unit 205 is inputted to the motion skip determining unit 210.

The motion skip determining unit 210 extracts motion skip information (motion_skip_flag) and the like to determine whether a current block is in a motion skip mode or not. Its details will be explained in the description of '2.1 Determination of Motion Skip Mode' with reference to FIG. 14, FIG. 16 and FIG. 17 later.

The motion information extracting unit 222 of the motion information obtaining unit 220 extracts motion information for a current block if the current block is not in the motion skip mode.

If the current block is in the motion skip mode, the motion information generating unit 224 skips extraction of motion information, searches a corresponding block, and then obtains motion information for the corresponding block. Its details will be explained in the description of 'Motion Information Generating Process in Motion Skip Mode' with reference to FIG. 15 later.

The motion compensating unit 230 generates a predictive value of the current block by performing motion compensation using the motion information (e.g., motion vector (mvLX), reference picture index (refIdxLX)) obtained by the motion information obtaining unit 220.

The block reconstructing unit reconstructs the current block using the predictive value of the current block.

And, the global motion vector obtaining unit 320 is configured to obtain a global motion vector $GDV_{cur}$ of a current picture to which the current block belongs. The global motion vector obtaining unit 320 may have the same configuration of the former global motion vector obtaining unit 120 shown in FIG. 9. So, details of the global motion vector obtaining unit 320 shall be omitted in the following description.

2.1 Motion Skip Mode Determining Process

A process for the motion skip determining unit 210 to determine whether a current block is in a motion skip mode is explained with reference to FIG. 12 and FIG. 14.

First of all, motion skip index information (motion_skip_idc) is extracted from a slice layer (S210). In this case, the motion skip index information (motion_skip_idc) in the information indicating whether a motion skip mode is used for at least one of blocks belonging to a slice (picture or sequence). If the motion skip index information (motion_skip_idc) is '0', it means that the motion skip mode is used for none of the blocks belonging to the slice. Thus, if the motion skip index information (motion_skip_idc) is '0', there is no block corresponding to the motion skip mode. So, it is unnecessary to extract motion skip flag information (motion_skip_flag) indicating whether the motion skip mode is used for each block from a macroblock layer. So, in case that a slice including blocks for which motion skip mode is not used is frequently generated, motion skip index information is set to be included in a slice layer (picture parameter set (PPS) or sequence parameter set (SPS)). This is advantageous in compression ratio or calculation amount.

Subsequently, attribute information of a current block including anchor picture flag information (anchor_pic_flag) or attribute information of a current picture is extracted (S220). In this case, the anchor picture flag information (anchor_pic_flag) is the information indicating whether a current picture is an anchor picture. If the current picture is the anchor picture, it is difficult to use a motion skip mode. So, if the current picture is the anchor picture, it is also unnecessary to extract motion skip flag information.

At a view to which a current block belongs, view dependency of a non-anchor picture (view_dependency_non_anchor) is decided (S230). The view dependency (view_dependency) in the non-anchor picture indicates whether a current picture is dependent on a different view. Since the current picture is able to refer to a picture of the different view, it means that the current picture is not decodable before decoding of the different view.

View dependency can be decided according to sequence parameter set (SPS) extension information. A process for deciding view dependency using the sequence parameter set extension information can be executed prior to a process for parsing a macroblock layer.

Meanwhile, view dependency of non-anchor picture (view_dependency_non_anchor) can be decided according to number information for interview references (num_non_anchor_refs_1X) and view ID information (non_anchor_ref_1X). If the view dependency does not exist in a non-anchor picture, motion information for a neighboring view is not decoded before a current picture (non-anchor picture) id decoded (yet, excluding a case of multi-loop). Thus, since motion information for a neighboring view is not usable in decoding a current picture, if the view dependency of the non-anchor picture does not exist, it may be agreed not to use the motion skip mode. So, if the agreement is made, it is a matter of course that the motion skip flag information needs not to be extracted.

Subsequently, at a view to which a current block belongs, view dependency of an anchor picture (view_dependency_anchor) is decided (S240). The view dependency (view_dependency) in the anchor picture indicates whether there exists a neighboring view of a current picture. It means that there can exist a disparity vector (e.g., global motion vector $GDV_A$ or $GDV_B$) that is a difference between a current view and a neighboring view.

The view dependency of anchor picture (view_dependency_anchor) can be decided according to number information for interview references (num_anchor_refs_1X) and view ID information (anchor_ref_1X). If the view dependency does not exist in an anchor picture, a global motion vector ($GDV_A$ or $GDV_B$) of anchor picture is unable to exist. In particular, since a global motion vector required for searching a corresponding block of a current block is not transmitted, if the view dependency of the anchor picture does not exist, it may be agreed not to use the motion skip mode. So, if the agreement is made, it is a matter of course that the motion skip flag information needs not to be extracted.

Meanwhile, it is not necessary to execute the steps S210 to 5240 entirely. Instead, at least one of the steps can be executed according to a setup. For instance, if it is set to use a motion skip mode for a non-anchor picture, the step S220 is executed only. If a motion skip mode is set usable just for a case that view dependency of a non-anchor picture exists, the step S210 and the step S230 are executed. In addition to this, if the motion skip mode is set usable just for a case that there exists view dependency of anchor picture, the steps S220 to S240 are executed. The step S210 is executed only if motion skip index information is agreed to use.

After completion of obtaining various kinds of the informations to extract the motion skip flag information through the steps S210 to 5240, if the informations meet a certain condition ('Yes' in the step S250), the motion skip flag information (motion_skip_flag) is extracted (S260).

FIG. 16 and FIG. 17 are diagrams of examples of syntax for motion skip mode. FIG. 16 shows syntax corresponding to a case that a precondition of a motion skip mode is a non-anchor picture (if(!anchor_picflag)). FIG. 17 shows syntax corresponding to a case that a precondition of a motion skip mode includes non-anchor picture view dependency (if (&&view_dependency_non_anchor_pic)) and anchor picture view dependency (if(&&view_dependency_anchor_pic)) as well as a non-anchor picture.

It is then decided whether a current block is in a motion skip mode using the motion skip flag information (motion_skip_flag) extracted in the step S260 (S270). FIG. 18 and FIG. 19 are diagrams of examples of the meaning of motion skip flag information. If agreement is made as shown in FIG. 18, the step S270 decides whether the current block is in the motion skip mode only. If agreement is made as shown in FIG. 19, it is further decided whether a direction of a corresponding block is spatial forward or spatial backward. The present invention is not restricted by the tables shown in FIG. 18 and FIG. 19.

As a result of the decision made by the step S270, if it is decided that the current block is not in the motion skip mode ('N' in the step S270), motion information for the current block is extracted (S280). In this case, the motion information includes macroblock type (mb_type), reference picture index (refIdxLX), motion vector (mvLX), and the like, which does not restrict the present invention. If the current block is in the motion skip mode ('Yes' in the step S270), a motion information generating process proceeds (S300). Details of the step S300 are explained in the following section with reference to FIG. 15.

2.2 Motion Information Generating Process in Motion Skip Mode

If it is decided that the current block is in the motion skip mode, a motion information generating process starts to proceed.

Referring to FIG. 13 and FIG. 15, a motion information skipping unit 224a of the motion information generating unit 224 skips the extraction of motion information if the current block is in the motion skip mode (S310).

Subsequently, a corresponding block searching unit 224b searches neighboring blocks for a corresponding block. To search for the corresponding block, the corresponding block searching unit 224 preferentially decides a neighboring view where the corresponding block exists (S320). In this case, the neighboring view is the view different from a view to which a current block belongs and is the view of a picture having motion information suitable for being used as motion information for the current block.

A view identifier (view_id) of a neighboring view of a current block can be explicitly transmitted via a specific variable (motion_skip_view_id or interview_base_view) included in a slice or macroblock layer. Alternatively, instead of being explicitly transmitted, the view identifier of the neighboring view can estimate the identifier of the neighboring view of the current block based on the aforesaid view dependency of the current picture (view_dependency_non_anchor). For instance, the identifier can be decided as a view (anchor_refL0[view_id][0]) closes to a current view among views (anchor)refL0[view_id][i]) of pictures referred to for the interview prediction of anchor pictures of the current view (view_id). This does not restrict the present invention.

Meanwhile, if the motion skip flag information extracted in the step S260 is agreed as shown in FIG. 19, it is able to decide whether a forward view or a backward view is selected from the views closest to the current view using the motion skip flag information.

The corresponding block searching unit 224b obtains a global motion vector ($GDV_{cur}$) of the current block to search for the corresponding block (S330). The global motion vector ($GDV_{cur}$) of the current block obtained in the step S330 may be calculated based on the motion vectors ($GDV_A$, $GDV_B$) of the neighboring anchor picture by the global motion vector obtaining unit 120 of the video signal processing apparatus 200 according to one embodiment of the present invention or correspond to a predetermined value ($GDV_{predetermined}$) or the value calculated by a predetermined method, which does not put limitation on the present invention.

The corresponding block searching unit 224b decides the corresponding block using the neighboring view decided in the step S320 and the global motion vector obtained in the step S330 (S340). In particular, the corresponding block (mbAddrNeighbor) is located at a position moved from the same position (mbAddr) of the current block by a global motion vector (globalDisparitymbLX). An address of the corresponding block can be calculated by Formula 3.

mbAddrNeighbor=mbAdrr+globalDisparity*MbLX[*1]
*Pic*WidthIn*Mbs*+globalDisparity*MbLX[*0]     [Formula 3]

Referring to Formula 3, an address (mbAddrNeighbor) of a corresponding block results from adding a address value of a global motion vector (globalDisparityMbLX) to an address (mbAdrr) of a current block. In this case, an address value (globalDisparityMbLX[1]*PicWidthInMbs+globalDisparityMbLX[0]) of the global motion vector is a value calculated by multiplying a y-axis component (globalDisparityMbLX[1]) by a number (PicWidthInMbs) of blocks in a horizontal direction within a picture, adding an x-axis component (globalDisparityMbLX[0]) to the multiplied result, and then transforming a 2-dimensional vector into a 1-dimensional index. In this case, the corresponding block is preferably decided as existing within the picture having the same time of the current block among pictures of neighboring views.

The motion information obtaining unit 224c extracts motion information for the corresponding block (S350). The motion information for the corresponding block can be the information extracted by the motion information extracting unit 222. If it is unable to extract the motion information for the corresponding block, e.g., if the corresponding block executes intra-prediction only without executing inter-prediction, motion information for a changed corresponding block in a manner of changing the neighboring view decided in the step S320 is extracted.

For instance, if the view forward closest to the current view is decided as the neighboring view in the step S320, the view backward closest to the current view is decided as the neighboring view.

Finally, the motion information obtaining unit 224c obtains the motion information for the current block using the motion information extracted in the step S350 (S360). In this case, the motion information for the corresponding block is usable as the motion information for the current block, which does not put limitation on the present invention.

INDUSTRIAL APPLICABILITY

Accordingly, the present invention is applicable to multi-view video encoding and decoding. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method for processing a multi-view video signal, comprising:
   extracting anchor picture flag information of a current picture in a current view from the multi-view video signal, the anchor picture flag information indicating whether the current picture is an anchor picture or a non-anchor picture;
   extracting motion skip information of a current block in the current picture, when the current picture is the non-anchor picture according to the anchor picture flag information; and,
   generating motion information for the current block using motion information for a corresponding block in a neighboring view when the current block is in a motion skip mode according to the motion skip information;
   determining a reference block in the current view based on the motion information of the current block; and
   decoding the current block in the current view by using the reference block,
   wherein the generating including:
   determining the corresponding block in the neighboring view based on a global motion vector of the current picture, the global motion vector of the current picture being generated using a global motion vector of the anchor picture; and
   obtaining the motion information for the determined reference block.

2. The method of claim 1, wherein the global motion vector of the current picture is generated based on a picture order count of the current picture and a picture order count of the anchor picture.

3. The method of claim 1, wherein the motion information comprises at least one of block type information, motion vector, and reference picture index.

4. The method of claim 1, wherein the multi-view video signal is received as a broadcast signal.

5. The method of claim 1, wherein the multi-view video signal is received on a digital medium.

6. A non-transitory computer-readable-medium comprising a program recorded therein to execute the method of claim 1.

7. An apparatus for processing a multi-view video signal, comprising:
  a decoding apparatus configured to,
    extract anchor picture flag information of a current picture in a current view from the multi-view video signal, the anchor picture flag information indicating whether the current picture is an anchor picture or a non-anchor picture,
    extract motion skip information of a current block in the current picture, when the current picture is the non-anchor picture according to the anchor picture flag information,
    determine a corresponding block in a neighboring view based on a global motion vector of the current picture, when the current block is in a motion skip mode according to the motion skip information, the global motion vector of the current picture being generated using a global motion vector of the anchor picture,
    obtain motion information from the determined corresponding block,
    generate motion information for the current block using motion information for the corresponding block in the neighboring view, and
    determine a reference block in the current view based on the motion information of the current block, and decode the current block in the current view by using the reference block.

* * * * *